(12) United States Patent
Park

(10) Patent No.: US 9,485,730 B2
(45) Date of Patent: Nov. 1, 2016

(54) CONNECTION CONTROL METHOD AND ELECTRONIC DEVICE THEREFOR

(71) Applicant: Samsung Electronics Co., Ltd., Suwon-si, Gyeonggi-do (KR)

(72) Inventor: Su-Young Park, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 300 days.

(21) Appl. No.: 14/068,481

(22) Filed: Oct. 31, 2013

(65) Prior Publication Data

US 2014/0177498 A1 Jun. 26, 2014

(30) Foreign Application Priority Data

Dec. 20, 2012 (KR) .................. 10-2012-0149826

(51) Int. Cl.
*H04L 12/26* (2006.01)
*H04W 52/02* (2009.01)

(52) U.S. Cl.
CPC .............................. *H04W 52/0225* (2013.01)

(58) Field of Classification Search
CPC ................................................ H04W 52/0225
USPC ....... 370/449–457, 338, 311; 455/434–435.2
See application file for complete search history.

(56) References Cited

U.S. PATENT DOCUMENTS

| | | | | |
|---|---|---|---|---|
| 2006/0146834 A1* | 7/2006 | Baker | ............... | H04W 36/0088 370/395.53 |
| 2010/0124240 A1* | 5/2010 | Lu | ........................ | H04W 56/00 370/503 |
| 2010/0329218 A1* | 12/2010 | Hoshino | ............... | H04W 48/18 370/335 |
| 2011/0171909 A1 | 7/2011 | Jung et al. | | |
| 2011/0273276 A1* | 11/2011 | Minemura | ........ | H04W 52/0235 340/10.1 |
| 2012/0172039 A1* | 7/2012 | Ko | ........................ | H04W 12/12 455/435.1 |
| 2012/0177361 A1* | 7/2012 | Hirano | ................. | H04B 10/272 398/1 |
| 2012/0250578 A1* | 10/2012 | Pani | ...................... | H04W 48/12 370/254 |
| 2013/0308512 A1* | 11/2013 | Jeong | ................ | H04W 52/0225 370/311 |

FOREIGN PATENT DOCUMENTS

| | | |
|---|---|---|
| KR | 100600405 B1 | 7/2006 |
| KR | 10-2011-0121435 A | 11/2011 |
| KR | 10-2011-0123347 A | 11/2011 |

* cited by examiner

*Primary Examiner* — Thai Hoang
(74) *Attorney, Agent, or Firm* — Jefferson IP Law, LLP

(57) ABSTRACT

A method and an apparatus for controlling communication connection in an electronic device are provided. The method includes detecting at least one peripheral, detecting at least one preference device among the at least one detected peripheral, and inactivating a communication module when at least one preference device is not detected among the at least one detected peripheral.

20 Claims, 11 Drawing Sheets

CONNECTION CONTROL METHOD AND ELECTRONIC DEVICE THEREFOR

CROSS-REFERENCE TO RELATED APPLICATION(S)

This application claims the benefit under 35 U.S.C. §119 (a) of a Korean patent application filed on Dec. 20, 2012 in the Korean Intellectual property Office and assigned Serial No. 10-2012-0149826, the entire disclosure of which is hereby incorporated by reference.

TECHNICAL FIELD

The present disclosure relates to a method and apparatus for controlling communication connection in an electronic device. More particularly, the present disclosure relates to a method and apparatus for controlling communication connection to connect with a device registered as a preference device in an electronic device.

BACKGROUND

As a result of electronic devices being developed to be more portable, such electronic devices have become necessities of modern people. Electronic devices evolved into multimedia devices which provide various services such as a voice and video communication service, an information input and output service, and a data transmission and reception service.

Recently, the use of local-area wireless communication has been increased in each of the electronic devices due to advantages of wireless communication, such as mobility and ease of installation and expansion. Herein, the local-area wireless communication means communication in which electronic devices which are located in a local area and are connected to each other exchange information wirelessly. The local-area wireless communication may include at least one of a wireless Local Area Network (LAN), Bluetooth communication, Near Field Communication (NFC), Zigbee communication, and the like.

When the electronic device uses the local-area wireless communication, the electronic device activates a local-area wireless communication module according to control of a user thereof and connects to a local-area wireless communication network. For example, when the electronic device uses a Wireless-Fidelity (Wi-Fi) network, the electronic activates a Wi-Fi module and connects to an Access Point (AP).

If the connection with the local-area wireless communication network is released, the electronic device searches an accessible local-area wireless communication network and attempts to connect with the searched local-area wireless communication network. When the electronic device does not connect with the local-area wireless communication network, the electronic device continuously searches an accessible local-area wireless communication network unless the local-area wireless communication module is inactivated. For example, the connection with the Wi-Fi network, the electronic device searches an accessible AP and attempts to connect to the searched AP. When the electronic device does not connect to the searched AP, the electronic device periodically searches an accessible AP unless the Wi-Fi module is inactivated. Accordingly, the electronic device consumes power during a process of searching an accessible AP.

As described above, although the connection with the local-area wireless communication network is released, the electronic device searches an accessible local-area wireless communication network and attempts to connect with the searched local-area wireless communication network. When the electronic device does not connect to the local-area wireless communication network, the electronic device periodically searches a local-area wireless communication network and connects to the searched local-area wireless communication network. Therefore, a problem associated with electronic devices according to the related art is that such electronic devices unnecessarily consume power during the above-described process.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to solve at least the above-mentioned problems and/or disadvantages and to provide at least the advantages described below. Accordingly, an aspect of the present disclosure is to provide a method and apparatus for controlling communication connection in an electronic device.

Another aspect of the present disclosure is to provide a method and apparatus for registering at least one device as a preference device and controlling communication connection in an electronic device.

Another aspect of the present disclosure is to provide a method and apparatus for controlling communication connection to connect with a device registered as a preference device in an electronic device.

Another aspect of the present disclosure is to provide a method and apparatus for controlling communication connection to determine whether to inactivate a communication module according to whether an electronic device connects with a preference device in the electronic device.

In accordance with an aspect of the present disclosure, a method of controlling communication connection in an electronic device is provided. The method includes detecting at least one peripheral, detecting at least one preference device among the at least one detected peripheral, and inactivating a communication module when at least one preference device is not detected among the at least one detected peripheral.

In accordance with another aspect of the present disclosure, an electronic device is provided. The electronic device includes at least one processor, at least one memory, and at least one program which is stored in the at least one memory and is configured to be executable by the at least one processor, wherein the at least one program detects at least one peripheral, detects at least one preference device among the at least one detected peripheral, and inactivates a communication module when at least one preference device is not detected among the at least one detected peripheral.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a description will be given for a method and apparatus for controlling communication connection and for reducing power consumption in an electronic device.

Hereinafter, a preference device includes a device determined as a device which is frequently used among at least one device which is connected through a communication module and performs a communication function in an electronic device. The preference device may be determined by a user of the electronic device.

Hereinafter, the electronic device may be any one of a mobile communication terminal, a Personal Digital Assistant (PDA), a laptop Personal Computer (PC), a smart phone, a netbook, a television, a Mobile Internet Device (MID), a Ultra Mobile Personal Computer (UMPC), a tablet PC, a navigation device, portable game console, a Portable/Personal Multimedia Player (PMP), a handheld e-book, a set-top box, an optical disc player, a desktop PC, and a Moving Picture Experts Group (MPEG) layer 3 (MP3) player, which provide a communication function. Herein, it is assumed that the communication function includes a local-area wireless communication function.

Figure 1:
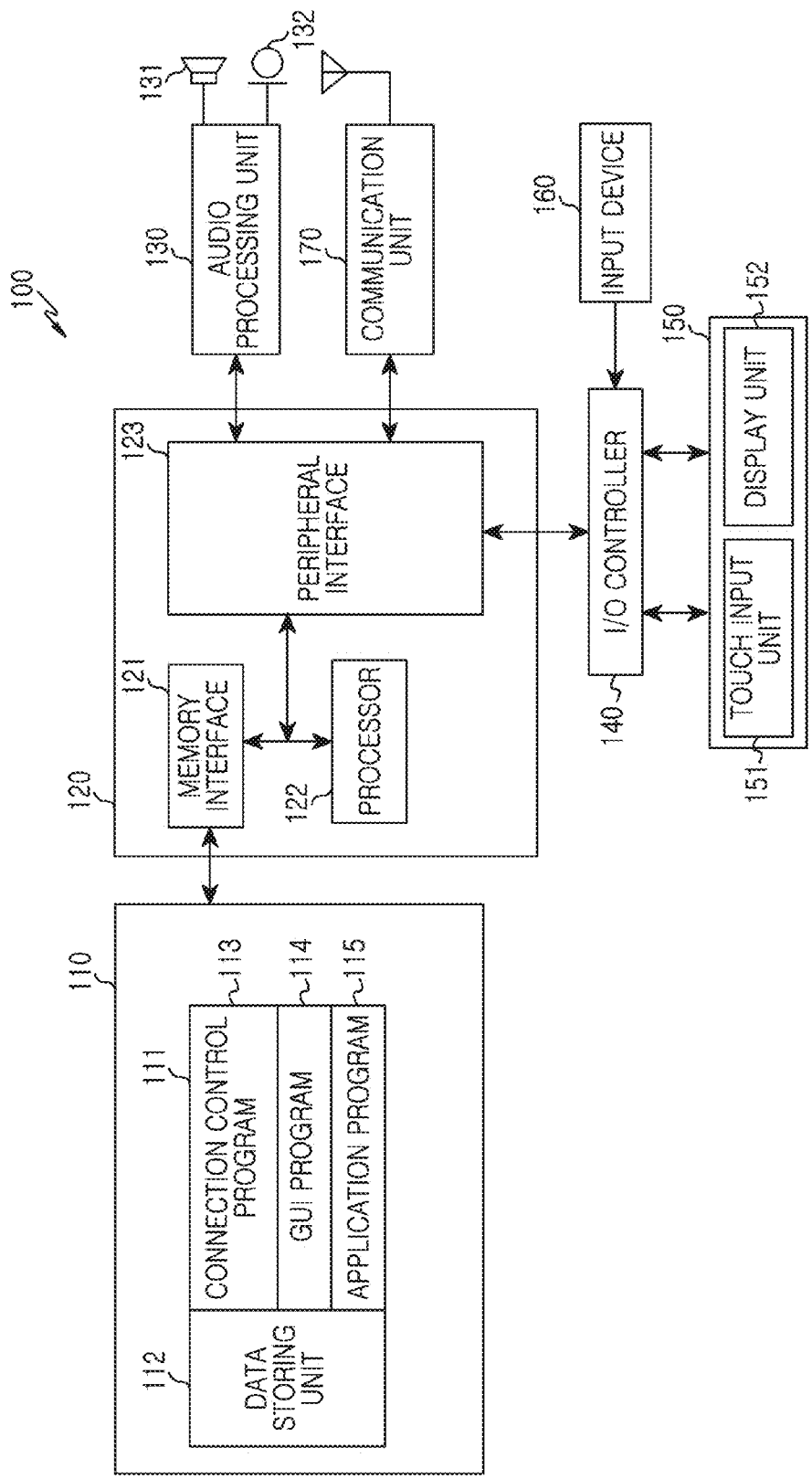
FIG. 1 is a block diagram illustrating configuration of an electronic device according to an embodiment of the present disclosure.

FIG. 1 is a block diagram illustrating configuration of an electronic device according to embodiment of the present disclosure.

Referring to FIG. 1, the electronic device 100 may include a memory 110, a processor unit 120, an audio processing unit 130, an Input/Output (I/O) controller 140, a touch screen 150, an input unit 160, and a communication unit 170.

A description will be given for respective components as follows.

According to various embodiments of the present disclosure, the memory 110 may be a plurality of memories. The memory 110 may include a program storing unit 111 for storing programs for controlling operations of the electronic device 100 and a data storing unit 112 for storing data generated while the programs are executed. The program storing unit 111 includes a connection control program 113, a Graphic User Interface (GUI) program 114, and at least one application program 115. Herein, the programs included in the program storing unit 111 may be expressed in an instruction set as a set of instructions.

The connection control program 113 may include at least one software component for determining at least one device connected with the electronic device 100 by communication as a preference device. For example, when the electronic device 100 performs communication with an Access Point (AP) connected through a Wi-Fi module, the connection control program 113 may determine the connected AP as a preference device.

The connection control program 113 may include at least one software component for controlling a communication module according to whether the electronic device 100 connects with a preference device. For one example, when the communication with the AP connected through the Wi-Fi module is released, the connection control program 113 searches peripheral APs. At this time, the connection control program 113 determines whether an AP registered as a preference device exists among the peripheral APs. When no AP registered as the preference device exists among the peripheral APs, the connection control program 113 searches peripheral APs in consideration of at least one of a predetermined time or the number of predetermined times from a time point when the communication with the AP is released, and determines whether the AP registered as the preference device exists again. When the AP registered as the preference device is not detected, the connection control program 113 inactivates (e.g., deactivates) the Wi-Fi module. For another example, when the Wi-Fi module is activated, the connection control program 113 searches peripheral APs. At this time, the connection control program 113 determines whether an AP registered as a preference device exists. If no AP registered as the preference device exists, the connection control program 113 searches peripheral APs in consideration of a predetermined time and the number of predetermined times from a time point when the Wi-Fi module is activated and determines whether the AP registered as the preference device exists again. When the AP registered as the preference device is not searched, the connection control program 113 inactivates the Wi-Fi module.

The GUI program 114 may include at least one software component for providing a UI as graphics on a display unit 152. For example, the GUI program 114 performs a control operation to display at least one peripheral information on the display unit 152 by the connection control program 113. For example, the GUI program 114 may perform a control operation to display a Service Set IDentification (SSID) of an AP, information about whether the AP is encrypted, an encryption type (e.g., a Wi-Fi Protected Access 2 (WPA2)) and/or a Received Signal Strength Indication (RSSI) of the AP, and/or the like.

The application program 115 may include a software component for at least one application program installed in the electronic device 100.

The processor unit 120 may include a memory interface 121, at least one processor 122, and a peripheral interface 123. Herein, the memory interface 121, at least the one processor 122, and the peripheral interface 123 which are included in the processor unit 120 may be integrated in at least one Integrated Circuit (IC) or may be separately implemented.

The memory interface 121 controls that a component like the processor 122 or the peripheral interface 123 accesses the memory 110.

The peripheral interface 123 controls connection among an I/O peripheral of the electronic device 100, the processor 122, and the memory interface 121.

Figure 2:
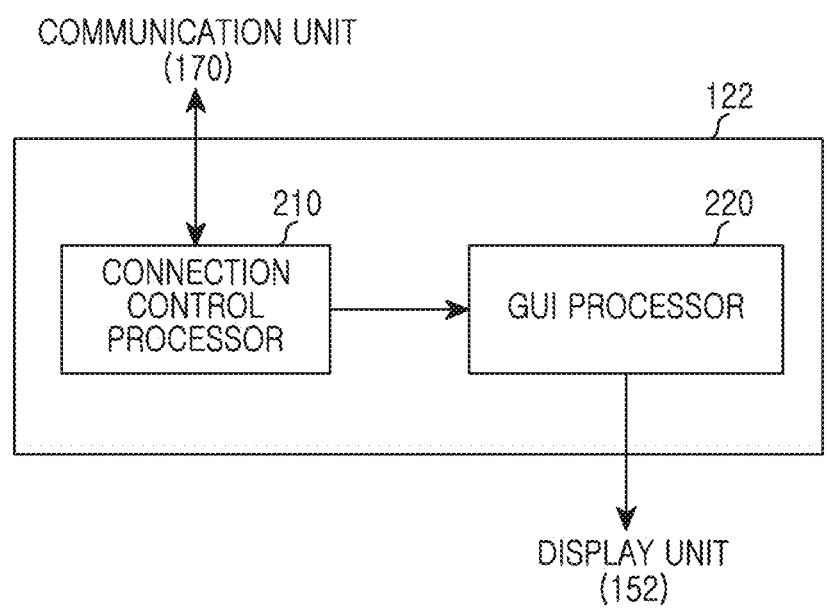
FIG. 2 is a block diagram illustrating detailed configuration of a processor according to an embodiment of the present disclosure.

The processor 122 provides a variety of multimedia services using at least one software program. In addition, the processor 122 executes at least one program stored in the memory 110 and provides a service according to the corresponding program. For example, the processor 122 may be, as shown in FIG. 2, configured to execute the connection control program 113 and control communication connection.

The audio processing unit 130 provides an audio interface between a user and the electronic device 100. For example, the audio processing unit 130 provides the audio interface between the user and the electronic device 100 through a speaker 131 and a microphone 132.

The I/O controller 140 provides an interface between I/O devices, such as the display device 152 and the input unit 160, and the peripheral interface 123.

The touch screen 150 is an input and output device for inputting and outputting information. The touch screen 150 may include a touch input unit 151 and the display unit 152.

The touch input unit 151 provides touch information detected through a touch panel to the processor unit 120 through the I/O controller 140. For example, the touch input unit 151 provides touch information by an electronic pen or a finger of the user to the processor unit 120 through the I/O controller 140.

The display unit 152 displays state information of the electronic device 100, characters input by the user, moving pictures, still pictures, and/or the like. For example, the display unit 152 displays at least one peripheral information by the GUI program 114. For example, the display unit 152 may display an SSID of an AP, information about whether the AP is encrypted, an encryption type (e.g., a WPA2) and/or an RSSI of the AP, and/or the like.

The input unit 160 provides input data generated by selection of the user to the processor unit 120 through the I/O controller 140. For example, the input unit 160 includes only a control button for control of the electronic device 100. As another example, the input unit 160 may be configured as a keypad for receiving input data from the user.

The communication unit 170 may include at least one software component for performing a data communication function. For example, the communication unit 170 may include a local-area communication module including a wireless Local Area Network (LAN), a Bluetooth network, a Near Field Communication (NFC) network, or the like. In addition, the communication unit 170 may include at least one software component for performing a communication function for voice communication and data communication. Herein, the communication unit 170 may be classified into a plurality of communication sub-modules which support different communication networks. For example, the communication network may be, but is not limited to, any one of a Global System for Mobile communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a wireless LAN, a Bluetooth network, a Near Field Communication (NFC) network, or the like.

FIG. 2 is a block diagram illustrating detailed configuration of a processor according to an embodiment of the present disclosure.

Referring to FIGS. 1 and 2, the processor 122 may include a connection control processor 210 and a GUI processor 220.

The connection control processor 210 executes the connection control program 113 of the program storing unit 111 and determines at least one device connected with the electronic device 100 by communication as a preference device. For example, when the electronic device 100 performs communication with an AP connected through a Wi-Fi module, the connection control processor 210 may determine the connected AP as a preference device.

The connection control processor 210 executes the connection control program 113 of the program storing unit 111 and controls a communication module according to whether the electronic device 100 connects with a preference device. For one example, when the communication with the AP connected through the Wi-Fi module is released, the connection control processor 210 searches peripheral APs. At this time, the connection control processor 210 determines whether an AP registered as a preference device among the peripheral APs exists. When no AP registered as the preference device exists, the connection control processor 210 searches peripheral APs in consideration of at least one of a predetermined time or the number of predetermined times from a time point when the communication with the AP is released and determines whether the AP registered as the preference device exists again. When the AP registered as the preference device is not detected, the connection control processor 210 inactivates the Wi-Fi module. As another example, when the Wi-Fi module is activated, the connection control processor 210 searches peripheral APs. At this time, the connection control processor 210 determines whether an AP registered as a preference device exists. If no AP registered as the preference device exists, the connection control processor 210 searches peripheral APs in consideration of a predetermined time and the number of predetermined times from a time point when the Wi-Fi module is activated and determines whether the AP registered as the preference device exists again. When the AP registered as the preference device is not searched, the connection control processor 210 inactivates the Wi-Fi module.

The GUI processor 220 executes the GUI program 114 of the program storing unit 111 and provides a UI as graphics on the display unit 152. For example, the GUI processor 220 performs a control operation to display at least one peripheral information on the display unit 152 by the connection control processor 210. For example, the GUI processor 220 may perform a control operation to display an SSID of an AP, information about whether the AP is encrypted, an encryption type (e.g., a WPA2) and/or an RSSI of the AP, and/or the like.

According to various embodiments of the present disclosure, the electronic device 100 may include the connection control processor 210 including the connection control program 113 to control communication connection.

According to various embodiments of the present disclosure, the electronic device 100 may include a separate connection control processing unit including the connection control program 113.

Figure 3:
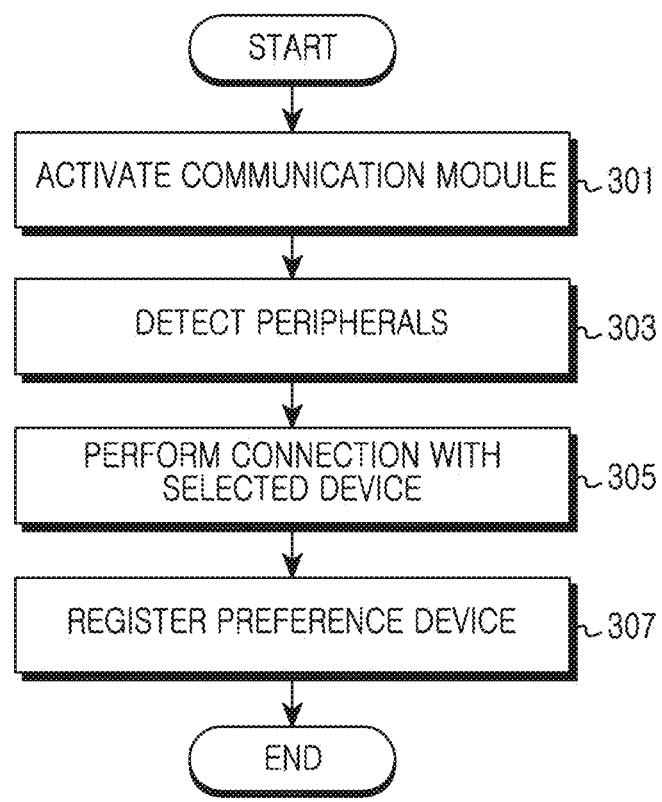
FIG. 3 is a flowchart illustrating a process of registering at least one device as a preference device in an electronic device according to an embodiment of the present disclosure.
Figure 7A:
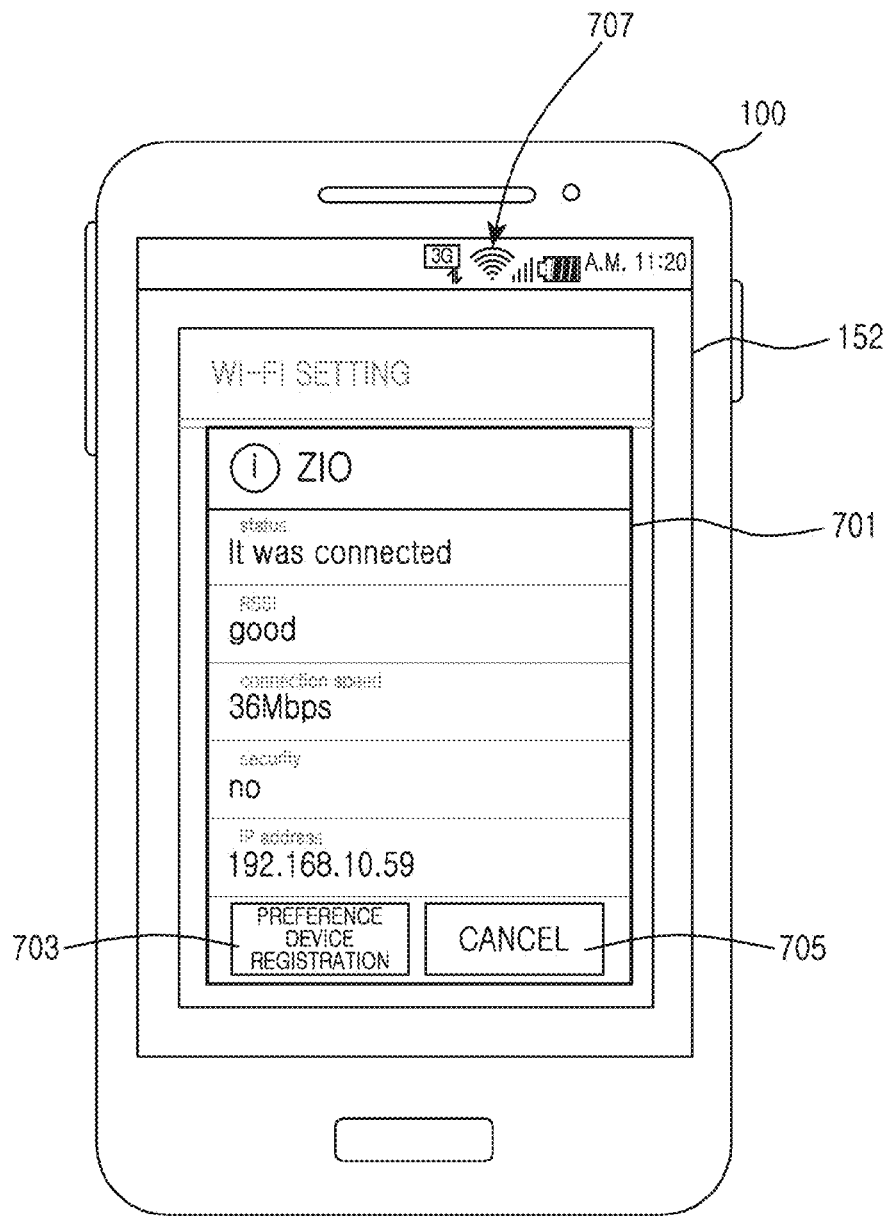
FIGS. 7A, 7B, 7C, and 7D are screens illustrating a process of controlling communication connection in an electronic device according to an embodiment of the present disclosure.

FIG. 3 is a flowchart illustrating a process of registering at least one device as a preference device in an electronic device according to an embodiment of the present disclosure. FIGS. 7A, 7B, 7C, and 7D are screens illustrating a process of controlling communication connection in an electronic device according to an embodiment of the present disclosure Referring to FIG. 3, at operation 301, the electronic device activates a communication module to perform communication. For one example, when a Wi-Fi module activation menu is selected, the electronic device activates a Wi-Fi module. At this time, as illustrated in FIG. 7A, the electronic device may display a Wi-Fi icon 707 on a display unit. As another example, the electronic device may determine whether an event for activating a communication module is generated in consideration of input information of a hardware button. As another example, the electronic device may determine whether an event for activating a communication module is generated in consideration of input information of a hardware button and motion information thereof. As another example, the electronic device may determine whether an event for activating a communication module is generated in consideration of touch information on a touch screen. As another example, the electronic device may determine whether an event for activating a communication module is generated in consideration of touch information on a touch screen and motion information thereof.

Figure 7B:
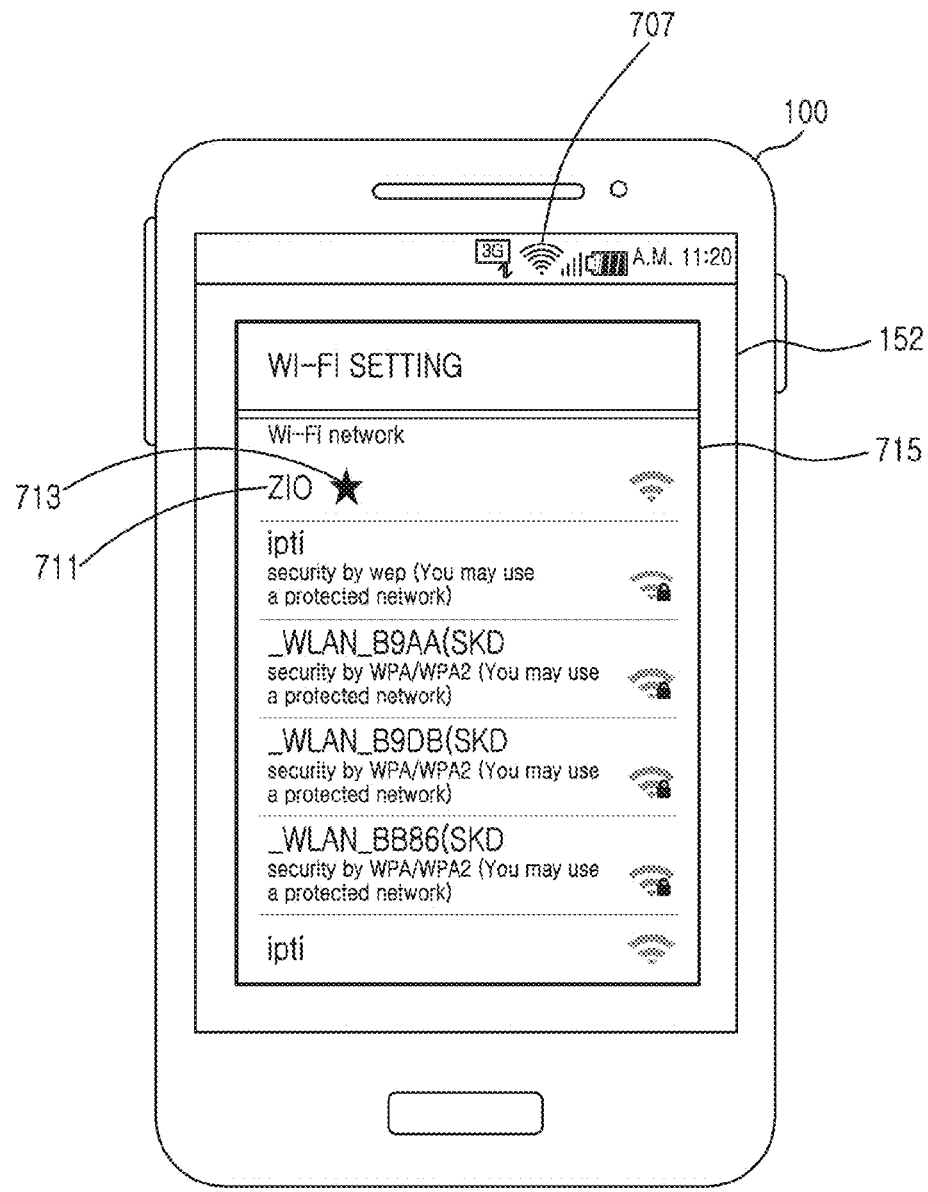

After the communication module is activated at operation 301, the electronic device proceeds to operation 303 at which the electronic device detects peripherals. For example, when the Wi-Fi module is activated, the electronic device receives a beacon message broadcasted by at least one AP. Herein, the beacon message may include an SSID of an AP, a physical address of the AP, an encryption type (e.g., a WPA2) of the AP, and/or the like. After the beacon message is received, as illustrated in FIG. 7B, the electronic device displays a peripheral AP list 715 on the display unit. Herein, the electronic device may display an SSID of an AP, information about whether the AP is encrypted, an encryption type and/or an RSSI of the AP, and/or the like.

After the peripherals are detected at operation 303, the electronic device proceeds to operation 305 at which the electronic device performs connection with a device selected by a user. For example, as illustrated in FIG. 7B, when a "ZIO" 711 is selected on the peripheral AP list 715 displayed on the display unit, the electronic device performs connection with the "ZIO" 711. At this time, when the "ZIO" 711 is encrypted, the electronic device may receive a key for connecting to the "ZIO" 711.

After the connection with the selected device is performed at operation 305, the electronic device proceeds to operation 307 at which the electronic device registers the connected device as a preference device. For example, when connection with the "ZIO" 711 is performed, the electronic device displays, as shown in FIG. 7A, a menu 701 for determining whether to register the "ZIO" 711 as a preference device on the display unit. When a "preference device registration" button 703 is selected, the electronic device registers the "ZIO" 711 as the preference device. As illustrated in FIG. 7B, a preference device icon 713 may be displayed in association with the "ZIO" 711 registered as the preference device. If a "cancel" button 705 is selected, the electronic device recognizes that the "ZIO" 711 is not registered as the preference device. Accordingly, the electronic device releases display of the preference device registration menu 701.

Figure 7C:
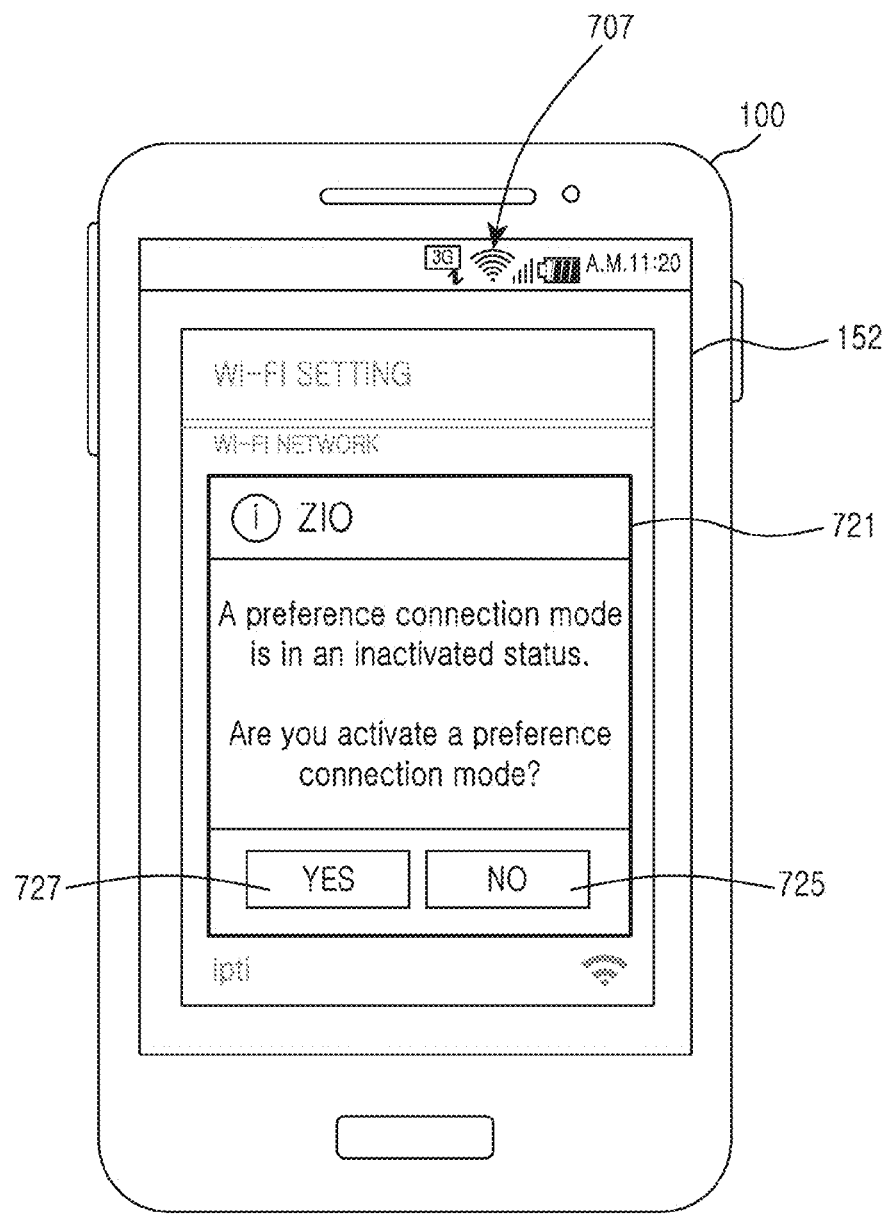

In addition, as illustrated in FIG. 7C, when the "ZIO" 711 is registered as the preference device, the electronic device may determine whether to activate a preference connection mode. Herein, it is assumed that the preference connection mode is in an inactivated state. When a "yes" button 727 is selected on a preference connection mode activation menu 721, the electronic device activates a preference connection mode. When a "no" button 725 is selected on the preference connection mode activation menu 721, the electronic device holds the preference connection mode as an inactivated state.

Thereafter, the electronic device ends the algorithm of FIG. 3.

According to various embodiments of the present disclosure, the electronic device registers a preference device while connecting with a device.

According to various embodiments of the present disclosure, the electronic device may register a preference device through a separate preference device management program.

Figure 4A:
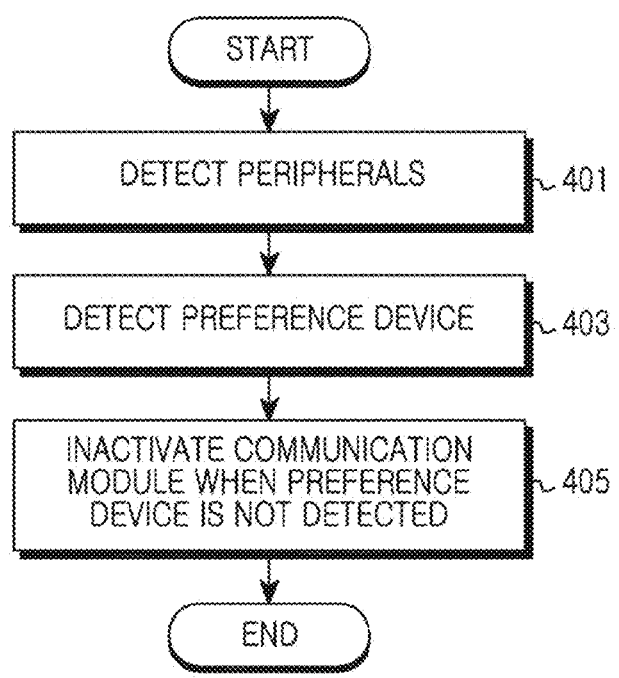
FIG. 4A is a flowchart illustrating a process of determining whether to inactivate a communication module according to whether an electronic device connects with a preference device according to an embodiment of the present disclosure.

FIG. 4A is a flowchart illustrating a process of determining whether to inactivate a communication module according to whether an electronic device connects with a preference device according to an embodiment of the present disclosure.

Referring to FIG. 4A, at operation 401, the electronic device detects peripherals. For example, when a Wi-Fi module is activated, the electronic device receives a beacon message broadcasted by at least one AP. At this time, as illustrated in FIG. 7A, the electronic device may display a Wi-Fi icon 707 on a display unit. Herein, the beacon message may include an SSID of an AP, a physical address of the AP, an encryption type (e.g., a WPA2) of the AP, and/or the like. After the beacon message is received, as illustrated in FIG. 7B, the electronic device displays a peripheral AP list 715 on the display unit. Herein, the electronic device may display an SSID of an AP, information about whether the AP is encrypted, an encryption type and/or an RSSI of the AP, and/or the like. As another example, the electronic device may detect peripherals although communication with an AP which is communicating is released.

After the peripherals are detected at operation 401, the electronic device proceeds to operation 403 at which the electronic device detects a preference device. For example, as illustrated in FIG. 7B, the electronic device determines whether a preference device exists on a peripheral AP list 715.

If the electronic device determines that no preference device exists among the peripherals, the electronic device proceeds to operation 405 at which the electronic device inactivates a communication module. For example, the electronic device may block current (e.g., power) consumed for searching the peripherals by inactivating the communication module.

In addition, if at least one preference device exists among the peripherals, the electronic device performs connection with the preference device. For example, as illustrated in FIG. 7B, when a "ZIO" 711 which is a preference device exists on the peripheral AP list 715 displayed on the display unit, the electronic device performs connection with the "ZIO" 711. At this time, the electronic device may automatically connect with the "ZIO" 711. If the "ZIO" 711 is encrypted, the electronic device may receive a key for connecting to the "ZIO" 711. In addition, when an encryption key of the "ZIO" 711 is changed, the electronic device may receive a key for connecting to the "ZIO" 711 again.

Figure 7D:
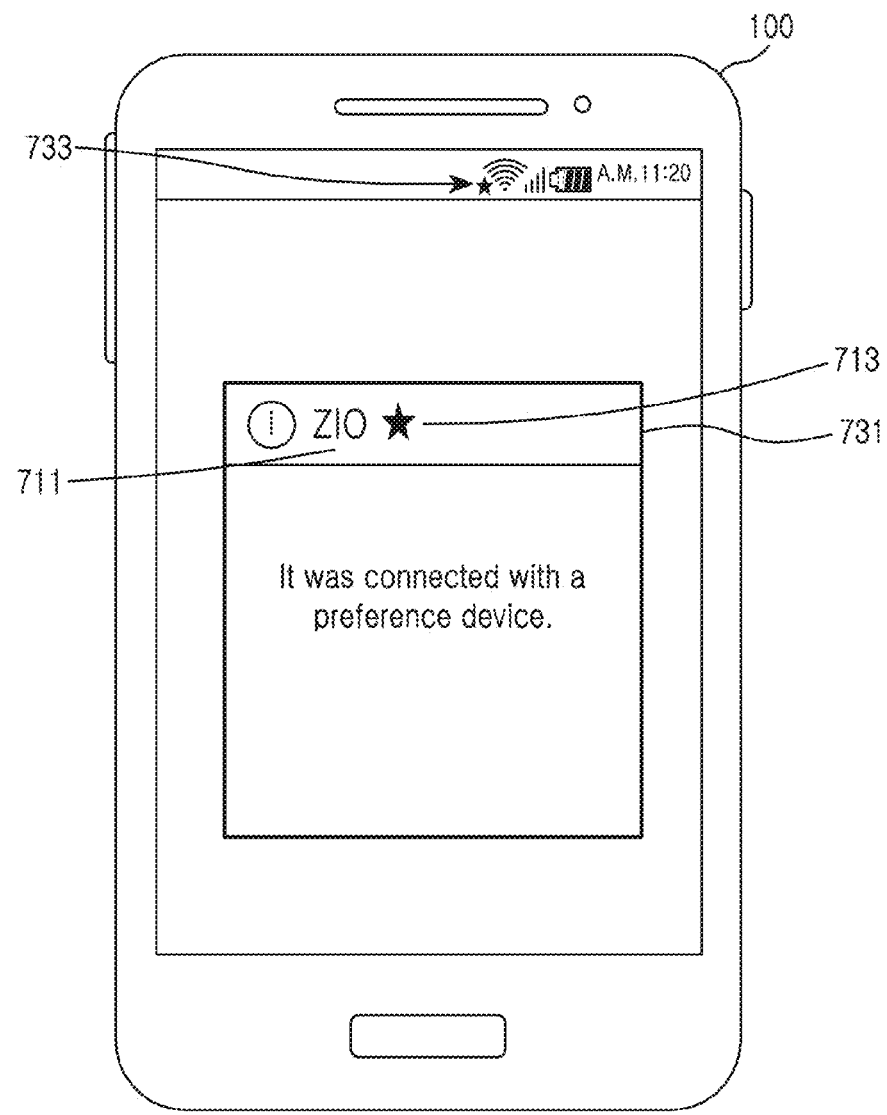

In addition, when the connection with the preference device is performed among the peripherals, as illustrated in FIG. 7D, the electronic device may display a notification message 731 including a connected AP name 711 and a preference device icon 713. In addition, when the connection with the preference device is performed among the peripherals, the electronic device may display a preference device icon 733 on a Wi-Fi icon displayed on a notification region. In addition, when the connection with the preference device is performed among the peripherals, the electronic device may display the Wi-Fi icon displayed on the notification region to be changed in a color of the Wi-Fi icon.

Thereafter, the electronic device ends the algorithm of FIG. 4A.

Figure 4B:
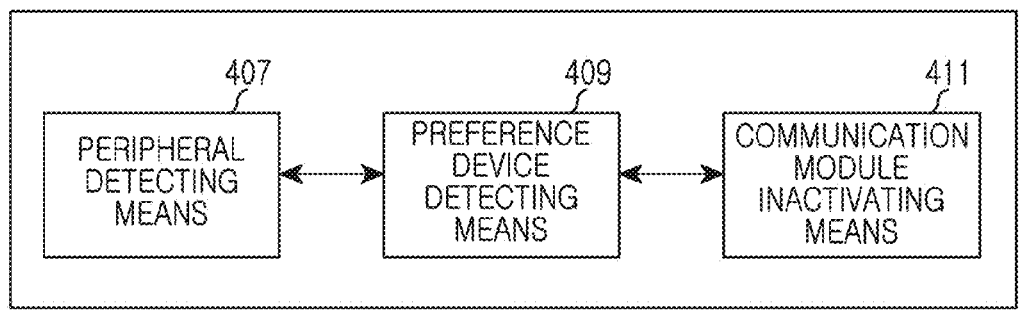
FIG. 4B is a block diagram illustrating configuration of an electronic device for determining whether to inactivate a communication module according to whether the communication device connects with a preference device according to an embodiment of the present disclosure.

As described above, the process of determining whether to inactivate a communication module according to whether the electronic device connects with a preference device may be configured, as illustrated in FIG. 4B, as an apparatus for determining whether to inactivate a communication module according to whether the electronic device connects with a preference device.

FIG. 4B is a block diagram illustrating configuration of an electronic device for determining whether to inactivate a communication module according to whether the communication device connects with a preference device according to an embodiment of the present disclosure.

Referring to FIG. 4B, the electronic device may include a peripheral detecting means 407 for detecting peripherals, a preference device detecting means 409 for detecting a preference device, and a communication module inactivating means 411 for inactivating a communication module.

The peripheral detecting means 407 detects peripherals. For one example, when a Wi-Fi module is activated, the electronic device receives a beacon message broadcasted by at least one AP. At this time, as illustrated in FIG. 7A, the electronic device may display a Wi-Fi icon 707 on a display unit. Herein, the beacon message may include an SSID of an AP, a physical address of the AP, an encryption type (e.g., a WPA2) of the AP, and/or the like. After the beacon message is received, as illustrated in FIG. 7B, the electronic device displays a peripheral AP list 715 on the display unit. Herein, the electronic device may display an SSID of an AP, information about whether the AP is encrypted, an encryption type and/or an RSSI of the AP, and/or the like. As another example, the electronic device may detect peripherals although communication with an AP which is communicating is released.

The preference device detecting means 409 detects a preference device. For example, as illustrated in FIG. 7B, the electronic device determines whether a preference device exists on the peripheral AP list 715.

The communication module inactivating means 411 inactivates the communication module. For example, if no preference device exists among the peripherals, the electronic device inactivates the communication module. For example, the electronic device may block current (e.g., power) consumed for searching the peripherals by inactivating the communication module.

In addition, the electronic device may further include a means for performing connection with a preference device. For example, as illustrated in FIG. 7B, when a "ZIO" 711 which is a preference device exists on the peripheral AP list 715 displayed on the display unit, the electronic device performs connection with the "ZIO" 711. At this time, the electronic device may automatically connect with the "ZIO" 711. If the "ZIO" 711 is encrypted, the electronic device may receive a key for connecting to the "ZIO" 711. In addition, when an encryption key of the "ZIO" 711 is changed, the electronic device may receive a key for connecting to the "ZIO" 711 again.

In addition, when the connection with the preference device is performed among the peripherals, as illustrated in FIG. 7D, the electronic device may display a notification message including a connected AP name 711 and a preference device icon 713. In addition, when the connection with the preference device is performed among the peripherals, the electronic device may display a preference device icon 733 on a Wi-Fi icon displayed on a notification region. In addition, when the connection with the preference device is performed among the peripherals, the electronic device may display the Wi-Fi icon displayed on the notification region to be changed in a color of the Wi-Fi icon.

As described above, the electronic device may include means for determining whether to inactivate the communication module according to whether the electronic device connects with a preference device. Herein, the electronic device may include respective means for determining whether to inactivate the communication module according to whether the electronic device connects with a preference device as one means.

Figure 5:
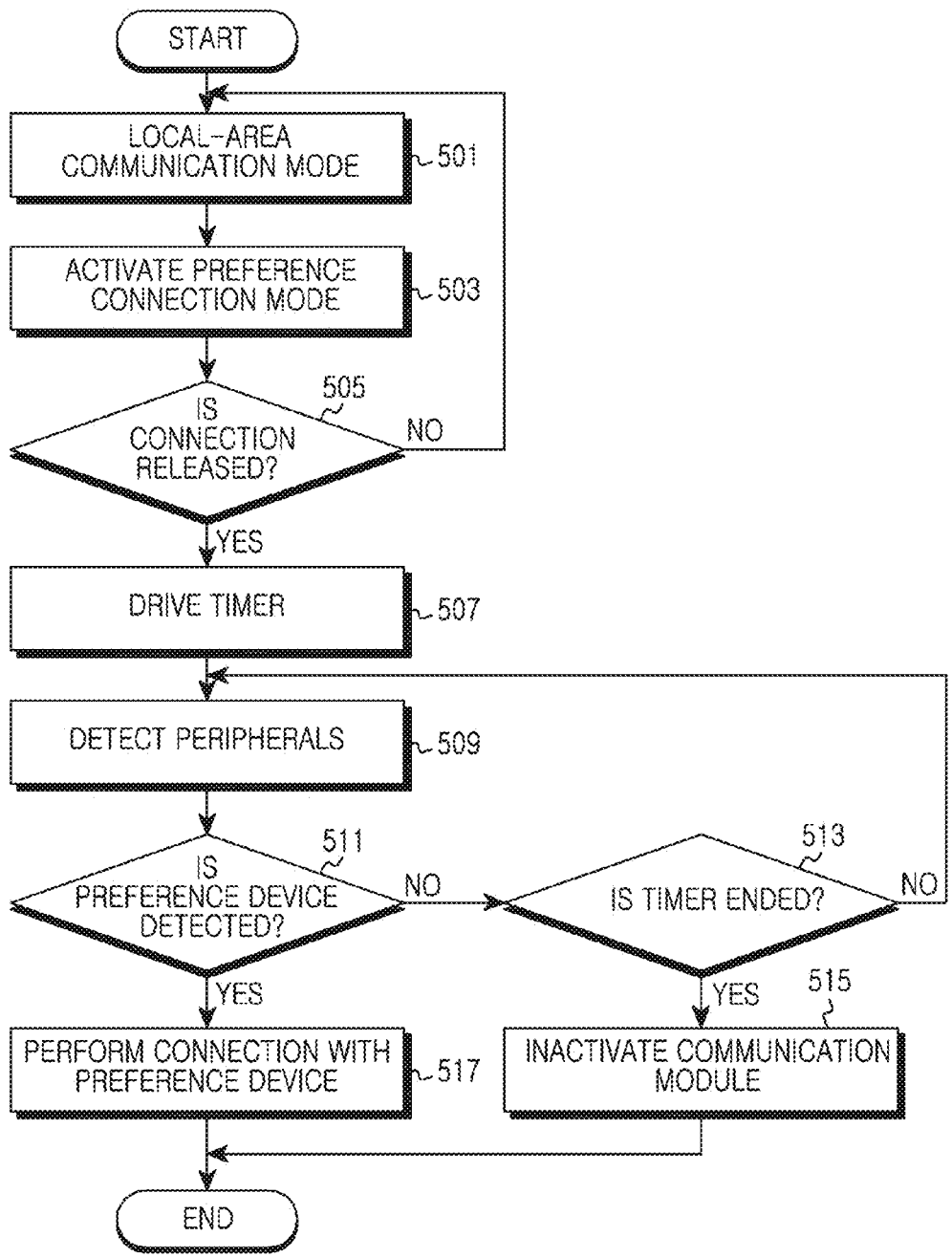
FIG. 5 is a flowchart illustrating a process of determining whether to inactivate a communication module according to whether an electronic device connects with a preference device according to an embodiment of the present disclosure.

FIG. 5 is a flowchart illustrating a process of determining whether to inactivate a communication module according to whether an electronic device connects with a preference device according to an embodiment of the present disclosure.

Referring to FIG. 5, at operation 501, the electronic device performs a local-area communication mode. For example, the electronic device performs communication with an AP connected through a Wi-Fi module.

Thereafter, the electronic device proceeds to operation 503 at which the electronic device activates a preference connection mode. For example, as illustrated in FIG. 7C, a "yes" button 723 is selected on a preference connection mode activation menu 721 displayed on a display unit, and as a result, the electronic device activates a preference connection mode. In contrast, when a "no" button 725 is selected on the preference connection mode activation menu 721, the electronic device recognizes that the preference connection mode is not activated. Therefore, the electronic device releases display of the preference connection mode activation menu 721 displayed on the display unit. In addition, when the AP connected through the Wi-Fi module is a preference device at operation 501, as illustrated in FIG. 7D, the electronic device may display a notification message including an AP name 711 and a preference device icon 713. In addition, the electronic device may display a preference device icon 733 on a Wi-Fi icon displayed on a notification region. In addition, when the connection with the preference device is performed among peripherals, the electronic device may display the Wi-Fi icon displayed on the notification region to be changed in a color of the Wi-Fi icon.

After the preference connection mode is activated at operation 503, the electronic device proceeds to operation 505 at which the electronic device determines whether connection with a device is released. For one example, when an RSSI received from the device is lower than a reference RSSI, the electronic device recognizes that the connection with the device is released. As another example, when a signal may be not received during a reference time from the device, the electronic device may recognize that the connection with the device is released. As another example, when a response is not received during the number of reference times from the preference device, the electronic device may recognize that the connection with the device is released.

If the electronic device determines that the connection with the device is not released at operation 505, the electronic device proceeds to operation 501 and maintains the local-area communication mode.

In contrast, if the electronic device determines that the connection with the device is released at operation 505, the electronic device proceeds to operation 507 at which the electronic device drives a timer. Herein, the timer is to determine whether to inactivate a communication module. A value of the timer may be a value set by a user or a value previously defined by a system. In addition, the value of the timer may be assumed to include at least one of a predetermined time and the number of predetermined times.

After the timer is driven at operation 507, the electronic device proceeds to operation 509 at which the electronic device detects peripherals. For example, when the connection with the AP is released, the electronic device receives a beacon message broadcasted by at least one AP. Herein, the beacon message may include an SSID of an AP, a physical address of the AP, an encryption type (e.g., a WPA2) of the AP, and/or the like. As illustrated in FIG. 7B, after the beacon message is received, the electronic device displays a peripheral AP list 715 on the display unit. Herein, the electronic device may display an SSID of an AP, information about whether the AP is encrypted, an encryption type and/or an RSSI of the AP, and/or the like.

After the peripherals are detected at operation 509, the electronic device proceeds to operation 511 at which the electronic device determines whether at least one preference device exists among the peripherals. For example, as illustrated in FIG. 7B, the electronic device determines whether a "ZIO" 711 which is a preference device exists on a peripheral AP list 715 displayed on the display unit.

If the electronic device determines that at least one preference device does not exist among the peripherals at operation 511, then the electronic device proceeds to operation 513 at which the electronic device determines whether the timer has ended.

If the electronic device determines that the timer has ended at operation 513, then the electronic device proceeds to operation 515 at which the electronic device inactivates the communication module. For example, the electronic device may block current (e.g., power) consumed for searching the peripherals by inactivating the communication module.

In contrast, if the electronic device determines that the timer has not ended at operation 513, then the electronic device proceeds to operation 509 at which the electronic device detects peripherals.

In contrast, if the electronic device determines that at least one preference device exists among the peripherals at operation 511, then the electronic device proceeds to operation 517 at which the electronic device performs connection with the preference device. For example, as illustrated in FIG. 7B, when the "ZIO" 711 which is the preference device exists on the peripheral AP list 715 displayed on the display unit, the electronic device performs connection with the "ZIO" 711. At this time, the electronic device may automatically connect with the "ZIO" 711. If the "ZIO" 711 is encrypted, the electronic device may receive a key for connecting to the "ZIO" 711. In addition, when an encryption key of the "ZIO" 711 is changed, the electronic device may receive a key for connecting to the "ZIO" 711 again.

In addition, as illustrated in FIG. 7D, when the connection with the preference device is performed among the peripherals, the electronic device may display a notification message including a connected AP name 711 and a preference device icon 713. In addition, when the connection with the preference device is performed among the peripherals, the electronic device may display a preference device icon 733 on a Wi-Fi icon displayed on a notification region. In addition, when the connection with the preference device is performed among the peripherals, the electronic device may display the Wi-Fi icon displayed on the notification region to be changed in a color of the Wi-Fi icon.

Thereafter, the electronic device ends the algorithm of FIG. 5.

Figure 6:
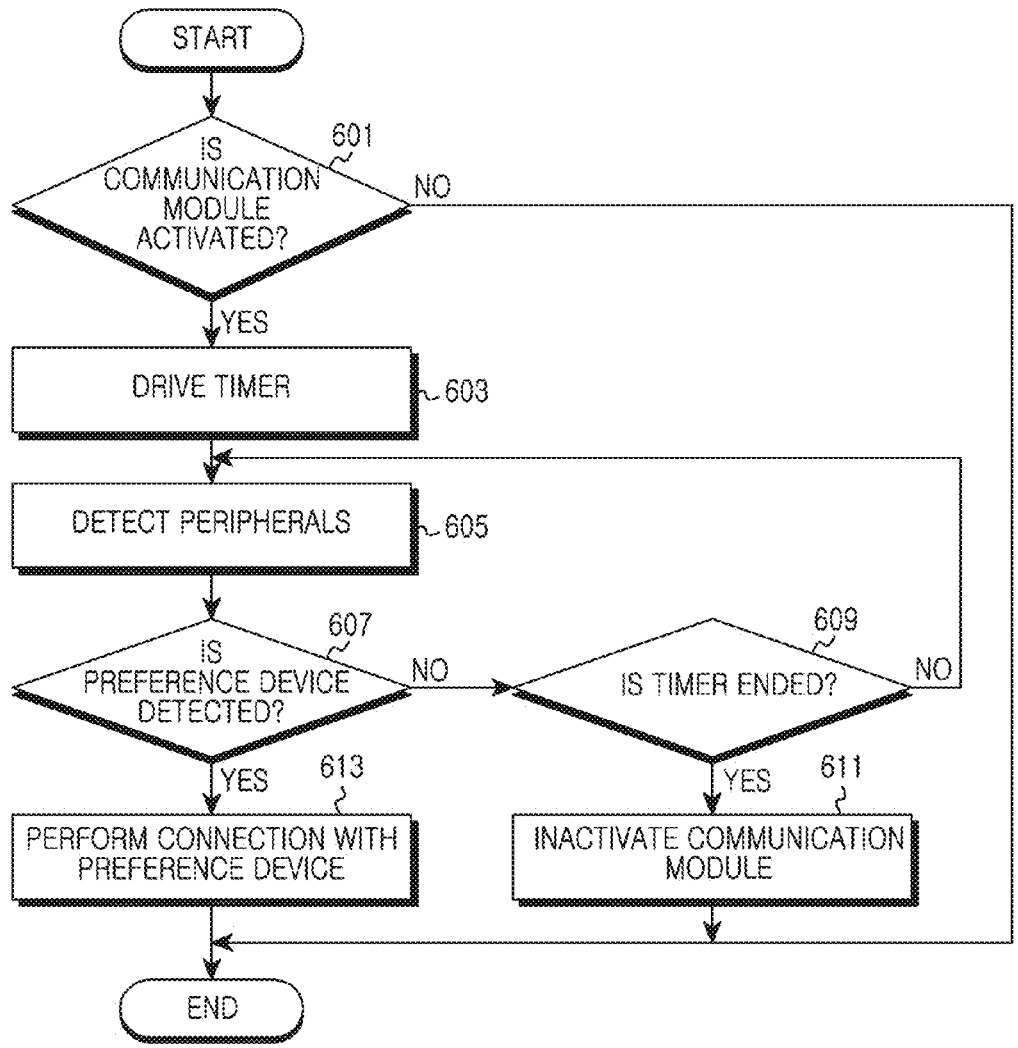
FIG. 6 is a flowchart illustrating a process of determining whether to inactivate a communication module according to whether an electronic device connects with a preference device according to an embodiment of the present disclosure.

FIG. 6 is a flowchart illustrating a process of determining whether to inactivate a communication module according to whether an electronic device connects with a preference device according to an embodiment of the present disclosure.

Referring to FIG. 6, at operation 601, the electronic device determines whether a communication module is activated. For one example, the electronic device determines whether a Wi-Fi module activation menu is selected by an operation of a user. As another example, the electronic device may determine whether an event for activating a communication module is generated in consideration of input information of a hardware button. As another example, the electronic device may determine whether an event for activating a communication module is generated in consideration of input information of a hardware button and motion information thereof. As another example, the electronic device may determine whether an event for activating a communication module is generated in consideration of touch information on a touch screen. As another example, the electronic device may determine whether an event for activating a communication module is generated in consideration of touch information on the touch screen and motion information thereof.

If the electronic device determines that the communication module is activated at operation 601, then the electronic device proceeds to operation 603 at which the electronic device drives a timer. Herein, the timer is to determine whether to inactivate the communication module. A value of the timer may be a value set by the user or may be a value previously defined by a system. The value of the timer may be assumed to include at least one of a predetermined time and the number of predetermined times.

After the timer is driven at operation 603, the electronic device detects peripherals at operation 605. For example, when the connection with the AP is released, the electronic device receives a beacon message broadcasted by at least one AP. Herein, the beacon message may include an SSID of an AP, a physical address of the AP, an encryption type (e.g., a WPA2) of the AP, and/or the like. After the beacon message is received, as illustrated in FIG. 7B, the electronic device displays a peripheral AP list 715 on the display unit. Herein, the electronic device may display an SSID of an AP, information about whether the AP is encrypted, an encryption type and/or an RSSI of the AP, and/or the like.

After the peripherals are detected at operation 605, the electronic device proceeds at operation 607 at which the electronic device determines whether at least one preference device exists among the peripherals. For example, as illustrated in FIG. 7B, the electronic device determines whether a "ZIO" 711 which is a preference device exists on the peripheral AP list 715 displayed on the display unit.

If the electronic device determines that no preference device exists among the peripherals at operation 607, then the electronic device proceeds to operation 609 at which the electronic device determines whether the timer has ended. For example, as illustrated in FIG. 7B, when the "ZIO" 711 which is the preference device does not exist on the peripheral AP list 715 displayed on the display unit, the electronic device determines whether the timer is ended to detect accessible peripherals.

If the electronic device determines that the timer has ended at operation 609, then the electronic device proceeds to operation 611 at which the electronic device inactivates the communication module. For example, the electronic device may block current consumed for searching the peripherals by inactivating the communication module.

In contrast, if the electronic device determines that the timer has not ended at operation 609, then the electronic device proceeds to operation 605 at which the electronic device detects peripherals.

In contrast, if the electronic device determines that at least one preference device exists among the peripherals at operation 607, then the electronic device proceeds to operation 613 at which the electronic device performs connection with the preference device. For example, as illustrated in FIG. 7B, when the "ZIO" 711 which is the preference device exists on the peripheral AP list 715 displayed on the display unit, the electronic device performs connection with the "ZIO" 711. At this time, the electronic device may automatically connect with the "ZIO" 711. If the "ZIO" 711 is encrypted, the electronic device may receive a key for connecting to the "ZIO" 711. In addition, when an encryption key of the "ZIO" 711 is changed, the electronic device may receive a key for connecting to the "ZIO" 711 again.

In addition, as illustrated in FIG. 7D, when the connection with the preference device is performed among the peripherals, the electronic device may display a notification message including a connected AP name 711 and a preference device icon 713. In addition, when the connection with the preference device is performed among the peripherals, the electronic device may display a preference device icon 733 on a Wi-Fi icon displayed on a notification region. In addition, when the connection with the preference device is performed among the peripherals, the electronic device may display the Wi-Fi icon displayed on the notification region to be changed in a color of the Wi-Fi icon.

In addition, after the communication module is activated, the electronic device activates a preference connection mode. For example, as illustrated in FIG. 7C, when a "yes" button 723 is selected on a preference connection mode activation menu 721 displayed on the display unit, the electronic device activates a preference connection mode. In contrast, when a "no" button 725 is selected on the preference connection mode activation menu 721, the electronic device recognizes that the preference connection mode is not activated. Therefore, the electronic device releases display of the preference connection mode activation menu 721 displayed on the display unit.

Thereafter, the electronic device ends the algorithm of FIG. 6.

According to various embodiments of the present disclosure, the electronic device drives the timer when the communication module is activated. According to various embodiments of the present disclosure, the electronic device may drive the timer when peripherals are detected. According to various embodiments of the present disclosure, the electronic device may drive the timer when no preference device exists.

As described above, when the electronic device is not connected with a preference device, the electronic device may reduce power consumption by inactivating the communication module. It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   detecting at least one peripheral;
   determining whether at least one preference device exists among the detected at least one peripheral;
   deactivating a communication module, when no preference device exists among the detected at least one peripheral;
   establishing a connection with the at least one preference device, when at least one preference device exists among the detected at least one peripheral; and
   displaying a notification message including an identification information of the connected at least one preference device.

2. The method of claim 1, wherein the detecting the at least one peripheral comprises:
   detecting the at least one peripheral through the communication module when the communication module is activated.

3. The method of claim 1, wherein the detecting the at least one peripheral comprises:
   detecting the at least one peripheral through the communication module when connection with a device connected through the communication module is released.

4. The method of claim 1, further comprising:
   determining, when no preference device exists, a number of times that no peripheral is detected;
   determining whether the number of times that no peripheral is detected is greater than or equal to a number of reference times;
   deactivating the communication module when the number of times that no peripheral is detected is greater than or equal to the number of reference times; and
   detecting the at least one peripheral when the number of times that no peripheral is detected is less than the number of reference times.

5. The method of claim 1, further comprising:
   determining, when no preference device exists, a number of times that no preference device exists;
   determining whether the number of times that no preference device exists is greater than or equal to a number of reference times;
   deactivating the communication module when the number of times that no preference device exists is greater than or equal to the number of reference times; and
   detecting the at least one peripheral when the number of times that no preference device exists is less than the number of reference times.

6. The method of claim 1, further comprising:
   determining, when no peripheral is detected, a number of times that no peripheral is detected;
   determining whether the number of the times that no peripheral is detected is greater than or equal to a number of reference times;
   deactivating the communication module when the number of times that no peripheral is detected is greater than or equal to the number of reference times; and
   detecting the at least one peripheral when the number of times that no peripheral is detected is less than the number of reference times.

7. The method of claim 1, further comprising:
   determining, when no preference device exists, a time when no peripheral is detected;
   determining whether the time when no peripheral is detected is greater than or equal to a reference time;
   deactivating the communication module when the time when no peripheral is detected is greater than or equal to the reference time; and
   detecting the at least one peripheral when the time when no peripheral is detected is less than the reference time.

8. The method of claim 1, further comprising:
   determining, when no preference device exists, a time when no preference device exists;
   determining whether the time when no preference device exists is greater than or equal to a reference time;
   deactivating the communication module when the time when no preference device exists is greater than or equal to the reference time; and
   detecting the at least one peripheral when the time when no preference device exists is less than the reference time.

9. The method of claim 1, further comprising:
   determining, when no peripheral is detected, a time when no peripheral is detected;
   determining whether the time when no peripheral is detected is greater than or equal to a reference time;
   deactivating the communication module when the time when no peripheral is detected is greater than or equal to the reference time; and
   detecting the at least one peripheral when the time when no peripheral is detected is less than the reference time.

10. The method of claim 1, wherein the at least one preference device includes a device determined as a device which is frequently used among at least one device which is connected through the communication module and performs a communication function.

11. An electronic device comprising:
    at least one processor;
    at least one memory; and
    at least one program which is stored in the at least one memory and is configured to be executable by the at least one processor,
    wherein the at least one program, when executed by the at least one processor, configures the processor to:
    detect at least one peripheral,
    determine whether at least one preference device exists among the detected at least one peripheral,
    deactivate a communication module, when no preference device exists among the detected at least one peripheral,
    establish a connection with the at least one preference device, when at least one preference device exists among the detected at least one peripheral, and
    display a notification message including an identification information of the connected at least one preference device.

12. The electronic device of claim 11, wherein the at least one processor is further configured to detect the at least one peripheral through the communication module when the communication module is activated.

13. The electronic device of claim 11, wherein the at least one processor is further configured to detect the at least one peripheral through the communication module when connection with a device connected through the communication module is released.

14. The electronic device of claim 11, wherein the at least one processor is further configured to:
    determine, when no preference device exists, a number of times that no peripheral is detected,
    determine whether the number of times that no peripheral is detected is greater than or equal to a number of reference times, deactivate the communication module when the number of times that no peripheral is detected is greater than or equal to the number of reference times, and detect the at least one peripheral when the number of times that no peripheral is detected is less than the number of the reference times.

15. The electronic device of claim 11, wherein the processor is further configured to:

determine, when no preference device exists, a number of times that no preference device exists, determine whether the number of times that no preference device exists is greater than or equal to a number of reference times, deactivate the communication module when the number of times that no preference device exists is greater than or equal to the number of reference times, and detect the at least one peripheral when the number of times that no preference device exists is less than the number of reference times.

16. The electronic device of claim 11, wherein the processor is further configured to:

determine, when no peripheral is detected, the number of times that no peripheral is detected, determine whether the number of times that no peripheral is detected is greater than or equal to the number of reference times, deactivate the communication module when the number of times that no peripheral is detected is greater than or equal to the number of the reference times, and detect the at least one peripheral when the number of times that no peripheral is detected is less than the number of the reference times.

17. The electronic device of claim 11, wherein the processor is further configured to:

determine, when no preference device exists, a time when no peripheral is detected, determine whether the time when no peripheral is detected is greater than or equal to a reference time, deactivate the communication module when the time when no peripheral is detected is greater than or equal to the reference time, and detect the at least one peripheral when the time when no peripheral is detected is less than the reference time.

18. The electronic device of claim 11, wherein the processor is further configured to:

determine, when no preference device exists, a time when no preference device exists, determine whether the time when no preference device exists is greater than or equal to a reference time, deactivate the communication module when the time when no preference device exists is greater than or equal to the reference time, and detect the at least one peripheral when the time when no preference device exists is less than the reference time.

19. The electronic device of claim 11, wherein the processor is further configured to:

determine, when no peripheral is detected, a time when no peripheral is detected, determine whether the time when no peripheral is detected is greater than or equal to a reference time, deactivate the communication module when the time when no peripheral is detected is greater than or equal to the reference time, and detect the at least one peripheral when the time when no peripheral is detected is less than the reference time.

20. The electronic device of claim 11, wherein the at least one preference device includes a device determined as a device which is frequently used among at least one device which is connected through the communication module and performs a communication function.

* * * * *